(12) United States Patent
Lu et al.

(10) Patent No.: US 12,607,767 B2
(45) Date of Patent: Apr. 21, 2026

(54) GAMMA FUSION COMPUTING METHOD BASED ON GAMMA PROBE STATE PARAMETERS

(71) Applicants:CHINA NATIONAL PETROLEUM CORPORATION, Beijing (CN); CNPC CHUANQING DRILLING ENGINEERING COMPANY LIMITED, Chengdu (CN)

(72) Inventors: Dengyun Lu, Chengdu (CN); Jing Bai, Chengdu (CN); Lei Li, Chengdu (CN); Jichuan Zhang, Chengdu (CN); Chongjun Huang, Chengdu (CN); Chong Liao, Chengdu (CN); Junbin Chen, Chengdu (CN); Bin Zhang, Chengdu (CN); Zhigang Dong, Chengdu (CN); Xinjian Wang, Chengdu (CN)

(73) Assignees: CHINA NATIONAL PETROLEUM CORPORATION, Beijing (CN); CNPC CHUANQING DRILLING ENGINEERING COMPANY LIMITED, Chengdu (CN)

( * ) Notice: Subject to any disclaimer, the term of this patent is extended or adjusted under 35 U.S.C. 154(b) by 585 days.

(21) Appl. No.: 17/927,749

(22) PCT Filed: May 25, 2021

(86) PCT No.: PCT/CN2021/095726
§ 371 (c)(1),
(2) Date: Nov. 25, 2022

(87) PCT Pub. No.: WO2021/238900
PCT Pub. Date: Dec. 2, 2021

(65) Prior Publication Data
US 2023/0204814 A1 Jun. 29, 2023

(30) Foreign Application Priority Data
May 29, 2020 (CN) .......................... 202010472831.4

(51) Int. Cl.
G01V 5/12 (2006.01)

(52) U.S. Cl.
CPC ...................................... G01V 5/12 (2013.01)

(58) Field of Classification Search
CPC ... G01V 5/12; G01V 5/06; G01V 5/04; G06F 17/18
See application file for complete search history.

(56) References Cited

U.S. PATENT DOCUMENTS

| | | | | |
|---|---|---|---|---|
| 2005/0234647 A1* | 10/2005 | Haugland | .............. | G01V 11/00 702/6 |
| 2014/0277752 A1* | 9/2014 | Chang | ..................... | E21B 44/00 700/275 |
| 2015/0148919 A1* | 5/2015 | Watson | .................. | G06N 5/043 700/31 |
| 2015/0219787 A1* | 8/2015 | Miller | ...................... | G01V 5/04 250/261 |
| 2016/0123137 A1* | 5/2016 | Liu | ........................... | E21B 7/06 250/254 |
| 2017/0351004 A1* | 12/2017 | Kirkhope | ................ | E21B 47/00 |
| 2019/0222524 A1* | 7/2019 | Naraki | .................... | H04L 67/61 |

* cited by examiner

*Primary Examiner* — Catherine T. Rastovski
*Assistant Examiner* — Yossef Korang-Beheshti

(57) ABSTRACT

A gamma fusion computing method based on gamma probe parameters includes: acquiring measurement values of two gamma probes in one continuous rotation period, and utilizing a mean value and a variance of the measurement values in the one rotation period as an evaluation reference value of each gamma probe; determining whether the gamma probes are abnormal, if the two gamma probes are both normal, utilizing the weight values to perform weight fusion on the measured values measured by two gamma probes, and if there is a gamma probe that is abnormal, then multiplying the average of the measured values of the normal gamma probe in the rotation period by 2 as a gamma output value for output.

12 Claims, No Drawings

GAMMA FUSION COMPUTING METHOD BASED ON GAMMA PROBE STATE PARAMETERS

BACKGROUND OF THE PRESENT INVENTION

Field of Invention

The present invention relates to the technical field of oil drilling equipment while drilling, and more particularly to a gamma fusion computing method based on gamma probe parameters.

Description of Related Arts

At present, gamma ray intensity is a parameter to indicate the characteristics of oil and gas reservoirs, and its numerical value is quite different from that of non-oil and gas reservoirs. Azimuth gamma measurement equipment while drilling is a typical formation evaluation equipment, which has been widely used in oil drilling development. The azimuth gamma measurement equipment while drilling is capable of identifying the formation gamma value at a certain azimuth of the tool while drilling. Through the azimuth gamma parameters uploaded to the ground in real time, the azimuth gamma measurement equipment can quickly and accurately judge whether the tool is hitting the target layer for measurement and a utilized for detecting the background gamma radiation of the formation, evaluating the gamma radiation level of the formation, and distinguishing the reservoir from the rock formation.

In the rotary steerable system, the gamma measurement unit uses two independent measuring probes to measure, and the average value of the two independent measuring probes is utilized as the computing result, if one measurement is abnormal, it will cause the output result to be abnormal, and it is impossible for engineering and technical personnel to provide correct identification.

SUMMARY OF THE PRESENT INVENTION

In order to overcome the defects and deficiency that exist in above-mentioned conventional arts, the present invention provides a gamma fusion computing method based on gamma probe state parameters, an object of the present invention is to solve the problems that in existing rotary steerable system when gamma measurement unit uses two independent measuring probes for measurement, if there is an abnormal measurement in one of them, abnormal output results are caused, which cannot provide correct identification for engineering and technical personnel. The gamma fusion computing method based on the gamma probes state parameters provided by the present invention is capable of accurately judging the abnormality of the gamma probes, and effectively solve the problems of abnormal output. If there is no gamma probe abnormality, the gamma value output by the computing method of the present invention is also more accurate, which can provide engineers with correct identification.

In order to solve the problems in the above-mentioned conventional arts, the present invention is achieved through the technical solutions as follows.

A gamma fusion computing method based on gamma probe state parameters, comprises steps of:

step (1) acquiring judgment benchmark comprising: after a tool enters a well and is calibrated, acquiring measured values of two gamma probes within one continuous rotation period by a gamma measurement conversion processing module; respectively calculating a mean and a variance of the measured values measured by the two gamma probes, adopting the mean value and variance as evaluation reference values of each of the gamma probes;

step (2) abnormality judging comprising: comparing the measured value of the gamma probe in a next rotation cycle with a judgment reference value, and judging whether the gamma probe is abnormal according to a comparison result; if the gamma probe is determined to be normal, taking the mean value and variance of the measured values of the gamma probes in the rotation cycle as an evaluation reference value of the next rotation cycle; if the gamma probes are identified as abnormal, keeping the evaluation reference value remains unchanged and recording an abnormal gamma probe number by a rotary steerable downhole control unit; and step (3) measured gamma outputting comprising: if the two gamma probes are normal, comparing the mean and variance of the measured values of the two gamma probes, and taking the mean and variance of the gamma probes with the most stable mean and variance as a reference computing value, weighing and fusing the measured values measured by the two gamma probes with a weight value, and outputting to the output as a final measured gamma; if one of the gamma probes is abnormal, an average value of the measured values of the normal gamma probe in the rotation cycle is multiplied by 2 as a gamma output value to the output.

Preferably, in the abnormality judging step, all measured values of the gamma probes in the rotation cycle are substituted into following formula for comparison, $$-1<(\text{measured value of the gamma probes}-\text{mean value of evaluation reference value})/\text{variance of the evaluation reference value}<1 \quad \text{(Formula 1)};$$

if the measured values of the gamma probes in the rotation period satisfy the above Formula 1 and account for more than 60% of the total measured values in the rotation period, the gamma probes are considered working normally, otherwise the gamma probe s are working abnormally.

Preferably, the adopting the mean value and variance as the evaluation reference values of each of the gamma probes in the step (1) specifically comprising: comparing the variances of the measured values of the two gamma probes within the rotation period to determine which is closer to 0, and adopting the mean and variance of the gamma probe with the variance closest to 0 within the rotation period as the computing basis value.

Preferably, in the step (3), the weighing and fusing the measured values measured by the two gamma probes with the weight value specifically comprising:

gamma output value=mean value of 1# gamma probe measurement value*P1+mean value of 2# gamma probe measurement value*P2, wherein P1=m/N, P2=1−P1, m represents that in the measured value of the 1# gamma probe, the deviation from the calculated reference mean is within ±p*the number of measurement points of the reference computing variance; N represents that in the measured values of 1# and 2# gamma probes, the deviation from the calculated reference mean is within ±p*the number of measurement points within the reference computing variance; and p is a set proportional coefficient, p∈(0,1).

Compared with conventional arts, the beneficial technical effects that the present invention brings is as follows.

1. The present invention provides a method for judging the abnormality of the gamma measuring probe, so that engineers and technicians can obtain the feedback information of the abnormality of the gamma measuring probe, and provide accurate judgment basis for the engineering and technical personnel; the present invention also provides a processing method after the abnormality of the gamma measuring probe and makes it possible to obtain a more accurate gamma value after an abnormality occurs in one gamma measuring probe, which provides judgment basis for engineering and technical personnel.

2. In the present invention, in the abnormal judgment step, the ratio setting range is defined as (−1, 1), according to the normal distribution characteristics, the probability that the measured value falls in this ratio range has reached 68%, and the probability of falling out of the ratio range are small probability events, similar to abnormalities.

3. In the conventional arts, the average value of two gamma measuring probes is taken as computing result, and in the present application, when two gamma measurements are all without abnormalities, carry outing weighing and fusing the measured values measured by the two gamma probes with a weight value, and outputting to the output as a final measured gamma. Compared with the conventional arts, the computing method of the present invention has a more accurate computing result and can provide correct identification for engineers and technicians.

4. The gamma output value of the present application is calculated with the deviation of the reference mean value in ±p*the number of measurement points in the computing reference variance, so that the measurement result is more accurate and capable of providing engineering and technical personnel with correct identification.

DETAILED DESCRIPTION OF THE PREFERRED EMBODIMENT

Combining with preferred embodiments, technical solutions of the present invention is set forth in further detail.

Embodiment 1

As a preferred embodiment of the present invention, the Embodiment 1 discloses technical solutions as follows.

A gamma fusion computing method based on gamma probe state parameters, comprises steps of:

step (1) acquiring judgment benchmark comprising: after a tool enters a well and is calibrated, acquiring measured values of two gamma probes within one continuous rotation period by a gamma measurement conversion processing module; respectively calculating a mean and a variance of the measured values measured by the two gamma probes, adopting the mean value and variance as evaluation reference values of each of the gamma probes;

step (2) abnormality judging comprising: comparing the measured value of the gamma probe in a next rotation cycle with a judgment reference value, and judging whether the gamma probe is abnormal according to a comparison result; if the gamma probe is determined to be normal, taking the mean value and variance of the measured values of the gamma probes in the rotation cycle as an evaluation reference value of the next rotation cycle; if the gamma probes are identified as abnormal, keeping the evaluation reference value remains unchanged and recording an abnormal gamma probe number by a rotary steerable downhole control unit; and step (3) measured gamma outputting comprising: if the two gamma probes are normal, comparing the mean and variance of the measured values of the two gamma probes, and taking the mean and variance of the gamma probes with the most stable mean and variance as a reference computing value, weighing and fusing the measured values measured by the two gamma probes with a weight value, and outputting to the output as a final measured gamma; if one of the gamma probes is abnormal, an average value of the measured values of the normal gamma probe in the rotation cycle is multiplied by 2 as a gamma output value to the output.

Embodiment 2

As a preferred embodiment of the present invention, the Embodiment 2 discloses technical solutions as follows.

A gamma fusion computing method based on gamma probe state parameters, comprises steps of:

step (1) acquiring judgment benchmark comprising: after a tool enters a well and is calibrated, acquiring measured values of two gamma probes within one continuous rotation period by a gamma measurement conversion processing module; respectively calculating a mean and a variance of the measured values measured by the two gamma probes, adopting the mean value and variance as evaluation reference values of each of the gamma probes;

step (2) abnormality judging comprising: comparing the measured value of the gamma probe in a next rotation cycle with a judgment reference value, and judging whether the gamma probe is abnormal according to a comparison result; if the gamma probe is determined to be normal, taking the mean value and variance of the measured values of the gamma probes in the rotation cycle as an evaluation reference value of the next rotation cycle; if the gamma probes are identified as abnormal, keeping the evaluation reference value remains unchanged and recording an abnormal gamma probe number by a rotary steerable downhole control unit;

wherein in the abnormality judging step, all measured values of the gamma probes in the rotation cycle are substituted into following formula for comparison:

$$-1 < (\text{measured value of the gamma probes} - \text{mean value of evaluation reference value})/\text{variance of the evaluation reference value} < 1 \quad \text{(Formula 1)};$$

if the measured values of the gamma probes in the rotation period satisfy the above Formula 1 and account for more than 60% of the total measured values in the rotation period, the gamma probes are considered working normally, otherwise the gamma probes are working abnormally; and step (3) measured gamma outputting comprising: if the two gamma probes are normal, comparing the mean and variance of the measured values of the two gamma probes, and taking the mean and variance of the gamma probes with the most stable mean and variance as a reference computing value, weighing and fusing the measured values measured by the two gamma probes with a weight value, and outputting to the output as a final measured gamma;

wherein the adopting the mean value and variance as the evaluation reference values of each of the gamma probes in the step (1) specifically comprising: comparing the variances of the measured values of the two gamma probes within the rotation period to determine which is closer to 0, and adopting the mean and variance of the gamma probe with the variance closest to 0 within the rotation period as the computing basis value;

if one of the gamma probes is abnormal, an average value of the measured values of the normal gamma probe in the rotation cycle is multiplied by 2 as a gamma output value to the output.

Embodiment 3

As a preferred embodiment of the present invention, the Embodiment 3 discloses technical solutions as follows.

A gamma fusion computing method based on gamma probe state parameters, comprises steps of:

step (1) acquiring judgment benchmark comprising: after a tool enters a well and is calibrated, acquiring measured values of two gamma probes within one continuous rotation period by a gamma measurement conversion processing module; respectively calculating a mean and a variance of the measured values measured by the two gamma probes, adopting the mean value and variance as evaluation reference values of each of the gamma probes;

step (2) abnormality judging comprising: comparing the measured value of the gamma probe in a next rotation cycle with a judgment reference value, and judging whether the gamma probe is abnormal according to a comparison result; if the gamma probe is determined to be normal, taking the mean value and variance of the measured values of the gamma probes in the rotation cycle as an evaluation reference value of the next rotation cycle; if the gamma probes are identified as abnormal, keeping the evaluation reference value remains unchanged and recording an abnormal gamma probe number by a rotary steerable downhole control unit;

wherein in the abnormality judging step, all measured values of the gamma probes in the rotation cycle are substituted into following formula for comparison:

$$-1 < (\text{measured value of the gamma probes} - \text{mean value of evaluation reference value}) / \text{variance of the evaluation reference value} < 1 \quad \text{(Formula 1)};$$

if the measured values of the gamma probes in the rotation period satisfy the above Formula 1 and account for more than 60% of the total measured values in the rotation period, the gamma probes are considered working normally, otherwise the gamma probes are working abnormally; and step (3) measured gamma outputting comprising: if the two gamma probes are normal, comparing the mean and variance of the measured values of the two gamma probes, and taking the mean and variance of the gamma probes with the most stable mean and variance as a reference computing value, weighing and fusing the measured values measured by the two gamma probes with a weight value, and outputting to the output as a final measured gamma;

wherein the adopting the mean value and variance as the evaluation reference values of each of the gamma probes in the step (1) specifically comprising: comparing the variances of the measured values of the two gamma probes within the rotation period to determine which is closer to 0, and adopting the mean and variance of the gamma probe with the variance closest to 0 within the rotation period as the computing basis value;

wherein in the step (3), the weighing and fusing the measured values measured by the two gamma probes with the weight value specifically refers to:

gamma output value=mean value of 1# gamma probe measurement value*P1+mean value of 2# gamma probe measurement value*P2, wherein P1=m/N, P2=1−P1, m represents that in the measured value of the 1# gamma probe, the deviation from the calculated reference mean is within ±p*the number of measurement points of the reference computing variance; that is, m represents in the 1# gamma probe measurement value, a measured value point which satisfies:

$$-p * \text{Calculation benchmark variance} < (1\# \text{ Gamma probe measured value} - \text{Calculation benchmark mean value}) < p * \text{Calculation benchmark variance} \quad \text{(Formula 2)};$$

N represents the number of measurement points in the measured values of 1# and 2# gamma probes, and the deviation from the calculation reference mean value is within ±p*calculation reference variance, that is, N represents a sum of the number of the measurement points of 1# gamma probes that satisfy Formula 2 and measurement points and the number of measurement points satisfying Formula 3 in the measurement value of 2# gamma probe;

$$-p * \text{Calculation benchmark variance} < (2\# \text{ Gamma probe measured value} - \text{Calculation benchmark mean value}) < p * \text{Calculation benchmark variance} \quad \text{(Formula 3)};$$

p is a set proportional coefficient, $p \in (0,1)$; in this embodiment, p is 0.1.

If one of the gamma probes is abnormal, the average value of the measured values of the normal gamma probe in the rotation cycle is multiplied by 2 as the gamma output value to the output.

What is claimed is:

1. A gamma fusion computing method based on gamma probe state parameters, comprising steps of:

step (1) acquiring judgment benchmark comprising: after a tool enters a well and is calibrated, acquiring measured values of two gamma probes within one continuous rotation period by a gamma measurement conversion processing module; respectively calculating a mean and a variance of the measured values measured by the two gamma probes, adopting the mean value and variance as evaluation reference values of each of the gamma probes;

step (2) abnormality judging comprising: comparing the measured value of each of the gamma probes in a next rotation cycle with a judgment reference value, and judging whether each of the gamma probes is abnormal according to a comparison result; if each of the gamma probes is determined to be normal, taking the mean value and variance of the measured values of the gamma probes in the rotation cycle as an evaluation reference value of the next rotation cycle; if the gamma probes are identified as abnormal, keeping the evaluation reference value remains unchanged and recording an abnormal gamma probe number by a rotary steerable downhole control unit; and step (3) measured gamma outputting comprising: if the two gamma probes are normal, comparing the mean and variance of the measured values of the two gamma probes, and taking the mean and variance of the gamma probes with the most stable mean and variance as a reference computing value, weighing and fusing the measured values measured by the two gamma probes with a weight value, and outputting to the output as a final measured gamma; if one of the gamma probes is abnormal, an average value of the measured values of the normal gamma probe in the rotation cycle is multiplied by 2 as a gamma output value to the output.

2. The gamma fusion computing method based on the gamma probe state parameters, as recited in claim 1, wherein in the abnormality judging step, all measured values of the gamma probes in the rotation cycle are substituted into following formula for comparison:

$$-1<(\text{measured value of the gamma probes}-\text{mean value of evaluation reference value})/\text{variance of the evaluation reference value}<1 \quad \text{(Formula 1)};$$

if the measured values of the gamma probes in the rotation period satisfy the above Formula 1 and account for more than 60% of the total measured values in the rotation period, the gamma probe are considered working normally, otherwise the gamma probe are working abnormally.

3. The gamma fusion computing method based on the gamma probe state parameters, as recited in claim 1, wherein the adopting the mean value and variance as the evaluation reference values of each of the gamma probes in the step (1) specifically comprising: comparing the variances of the measured values of the two gamma probes within the rotation period to determine which is closer to 0, and adopting the mean and variance of the gamma probe with the variance closest to 0 within the rotation period as a computing basis value.

4. The gamma fusion computing method based on the gamma probe state parameters, as recited in claim 1, wherein in the step (3), the weighing and fusing the measured values measured by the two gamma probes with the weight value specifically comprising:

gamma output value=mean value of 1# gamma probe measurement value*P1+mean value of 2# gamma probe measurement value*P2, wherein P1=m/N, P2=1−P1, m represents that in the measured value of the 1# gamma probe, the deviation from the calculated reference mean is within ±p*the number of measurement points of the reference computing variance; N represents that in the measured values of 1# and 2# gamma probes, the deviation from the calculated reference mean is within ±p*the number of measurement points within the reference computing variance; and p is a set proportional coefficient, p∈(0,1).

5. The gamma fusion computing method based on the gamma probe state parameters, as recited in claim 3, wherein in the step (3), the weighing and fusing the measured values measured by the two gamma probes with the weight value specifically comprising:

gamma output value=mean value of 1# gamma probe measurement value*P1+mean value of 2# gamma probe measurement value*P2, wherein P1=m/N, P2=1−P1, m represents that in the measured value of the 1# gamma probe, the deviation from the calculated reference mean is within ±p*the number of measurement points of the reference computing variance; N represents that in the measured values of 1# and 2# gamma probes, the deviation from the calculated reference mean is within ±p*the number of measurement points within the reference computing variance; and p is a set proportional coefficient, p∈(0,1).

6. The gamma fusion computing method based on the gamma probe state parameters, as recited in claim 4, wherein m represents in the 1# gamma probe measurement value, a measured value point which satisfies:

$$-p*\text{Calculation benchmark variance}<(1\#\text{ Gamma probe measured value}-\text{Calculation benchmark mean value})<p*\text{Calculation benchmark variance} \quad \text{(Formula 2)}$$

measured value points.

7. The gamma fusion computing method based on the gamma probe state parameters, as recited in claim 5, wherein m represents in the 1# gamma probe measurement value, a measured value point which satisfies:

$$-p*\text{Calculation benchmark variance}<(1\#\text{ Gamma probe measured value}-\text{Calculation benchmark mean value})<p*\text{Calculation benchmark variance} \quad \text{(Formula 2)}.$$

8. The gamma fusion computing method based on the gamma probe state parameters, as recited in claim 4, wherein N represents a sum of the number of the measurement points of 1# gamma probes that satisfy Formula 2 and measurement points and the number of measurement points satisfying Formula 3 in the measurement value of 2# gamma probe;

$$-p*\text{Calculation benchmark variance}<(2\#\text{ Gamma probe measured value}-\text{Calculation benchmark mean value})<p*\text{Calculation benchmark variance} \quad \text{(Formula 3)}.$$

9. The gamma fusion computing method based on the gamma probe state parameters, as recited in claim 7, wherein N represents a sum of the number of the measurement points of 1# gamma probes that satisfy Formula 2 and measurement points and the number of measurement points satisfying Formula 3 in the measurement value of 2# gamma probe;

$$-p*\text{Calculation benchmark variance}<(2\#\text{ Gamma probe measured value}-\text{Calculation benchmark mean value})<p*\text{Calculation benchmark variance} \quad \text{(Formula 3)}.$$

10. The gamma fusion computing method based on the gamma probe state parameters, as recited in claim 7, wherein the one continuous rotation period means a period that the probes rotates for a circle.

11. The gamma fusion computing method based on the gamma probe state parameters, as recited in claim 7, wherein the one continuous rotation period means a period that the probes rotates for a circle.

12. The gamma fusion computing method based on the gamma probe state parameters, as recited in claim 7, wherein the judgment benchmark is set to be (−1, 1).

* * * * *